United States Patent [19]
Repsher et al.

[11] 3,833,392
[45] Sept. 3, 1974

[54] COATING COMPOSITION AND METHOD FOR PREPARING WATER-SOLUBLE CELLULOSIC POLYMER COATING COMPOSITIONS FOR COATING FLUORESCENT TUBES

[75] Inventors: Robert W. Repsher, Butler; Gordon C. Gainer, Pittsburgh; Russell M. Luck, Monroeville; David H. Davies, Pittsburgh, all of Pa.

[73] Assignee: Westinghouse Electric Corporation, Pittsburgh, Pa.

[22] Filed: Aug. 9, 1971

[21] Appl. No.: 170,018

[52] U.S. Cl............... 106/193, 106/198, 252/301.3, 260/232
[51] Int. Cl............................................ C08b 27/04
[58] Field of Search.................. 106/193, 188, 197; 117/33.5 L; 252/301.3; 260/232

[56] References Cited
UNITED STATES PATENTS

| | | | |
|---|---|---|---|
| 2,617,800 | 11/1952 | Bergman | 106/197 |
| 3,055,767 | 9/1962 | Quirk | 117/33.5 L |
| 3,316,109 | 4/1967 | Rimbach | 252/301.3 R |
| 3,424,605 | 1/1969 | Beaumont et al. | 252/301.3 R |
| 3,485,915 | 12/1969 | Gerstein | 106/189 |
| 3,557,082 | 1/1971 | Bridgeford | 260/232 |
| 3,583,876 | 6/1971 | Wennergren | 106/193 J |

*Primary Examiner*—Theodore Morris
*Attorney, Agent, or Firm*—R. A. Stoltz

[57] ABSTRACT

Method of preparing suspension for coating discharge devices with finely divided particulate material, wherein an aqueous solution of a hydroxy alkyl cellulose is initially purified by passing the solution through an ion exchange system, and the particulate material to be coated is thereafter suspended in the purified solution. The resulting coating composition has an extremely low level of impurity material which, if present, could impair the performance of the completed discharge device, after combustion.

6 Claims, 4 Drawing Figures

PATENTED SEP 3 1974

```
PREPARE AN AQUEOUS SOLUTION OF
HYDROXY PROPYLMETHYL CELLULOSE
            ↓
PASS SOLUTION THROUGH THE BEDS
OF AN ION EXCHANGER
            ↓
ADD WETTING AGENT, DEFOAMING AGENT,
GLYCERIN AND ALUMINUM OXIDE PARTICLES
            ↓
ADD FINELY DIVIDED INORGANIC PHOSPHORS
            ↓
COAT SUSPENSION ONTO LAMP ENVELOPE
AND COMPLETE LAMP FABRICATION
```

COATING COMPOSITION AND METHOD FOR PREPARING WATER-SOLUBLE CELLULOSIC POLYMER COATING COMPOSITIONS FOR COATING FLUORESCENT TUBES

BACKGROUND OF THE INVENTION

This invention relates to coating compositions and methods for preparing same for coating inorganic particles onto the interior surface of a discharge lamp envelope and, more particularly, to a coating composition incorporating a particular binder material and to methods for treatment of such coating compositions during their preparation to improve the performance of the finished discharge device.

Discharge device envelopes are usually coated by suspending finely divided phosphor material in a liquid vehicle which has dissolved therein an organic binder in order to impart the proper viscosity thereto. This suspension or socalled "paint" is flowed over the interior surface of the envelope, the excess is drained, the liquid vehicle volatilized, and the coated tube then heated in an oxidizing atmosphere to drive off and combust the binder material. Some of these paints have used coating compositions containing organic solvents and binders such as ethyl cellulose, while other paints have used water as a solvent and water-soluble binders such as polyacrylic acid.

Many precautions must be taken with regard to the flammable nature of any organic solvent and there is also some impairment of performance of the finished discharge device because of unwanted residues which have not burned out with the organic binder. While the use of water as a solvent circumvents the problems of flammability of organic solvents, the binders of the prior art water-solution paints usually have displayed burnout characteristics of such nature such that the performance of the finished device tends to be impaired. The problem of impurities which exist in hydroxy ethyl cellulose have been recognized and are set forth in U.S. Pat. No. 3,055,767, dated Sept. 25, 1962. In accordance with the teachings of this patent, hydroxy ethyl cellulose is initially washed in methyl alcohol prior to incorporation in any vehicle. Such a procedure is relatively costly, involves the use of flammable solvents, requires batch processing of material, and involves an initial processing step.

The use of methyl cellulose based paints is described in U.S. Pat. No. 2,726,966, dated Dec. 13, 1955. Methyl cellulose paints generally have undesirable flow properties, and apparently are not widely used.

The use of polyacrylic acid based paints is described in U.S. Pat. No. 3,006,781, dated Oct. 31, 1961. Polyacrylic acid, after burnout, leaves a significant carbonaceous residue and, in addition, reactivity of the acid group renders this material somewhat incompatible with many of the commonly used phosphors and pigments which are used in the manufacture of fluorescent lamps. For example, the polyacrylic acid systems tend to cause cadmium borate phosphor to flocculate and there is some tendency for calcium tungstate, and many other, phosphors to react and then precipitate from suspension. Also, due to the high temperature required for burnout of the binder, there is some tendency for discoloration of calcium sulfide/selenide pigments as are used in some types of fluorescent lamps.

SUMMARY OF THE INVENTION

In accordance with the present invention there is first prepared an aqueous solution of a hydroxy alkyl cellulose consisting essentially of from about 0.01 to 5 percent by weight of at least one of hydroxy propylmethyl cellulose, hydroxy propyl cellulose, hydroxy ethyl cellulose, and hydroxy butyl cellulose. This prepared solution is then purified by passing the solution through an ion exchange system in order to remove substantially all dissolved salts which exist therein. After purification, there is suspended in the solution from about 25 to 50 percent by weight of the solution of the finely divided inorganic particles to be coated, such as the finely divided fluorescent material. Supplemental coating agents may be used, such as wetting agents and defoaming agents, as well as plasticizers and adhesion promoters. Such of these materials as are soluble and non-ionic can be added to the aqueous solution either before or after it is passed through the ion exchange system. The preferred coating composition incorporates hydroxy propylmethyl cellulose as a binder material which has a very low level of impurities, burns out at a suitably low temperature and is resistant to attack by micro-organisms.

BRIEF DESCRIPTION OF THE DRAWINGS

For a better understanding of the invention, reference may be had to the preferred embodiment, exemplary of the invention, shown in the accompanying drawings in which:

FIG. 1 is an elevational view, partly in section, of a fluorescent lamp which incorporates phosphor coated in accordance with the improved coating composition and method of the present invention;

DESCRIPTION OF THE PREFERRED EMBODIMENTS

Figure 2:
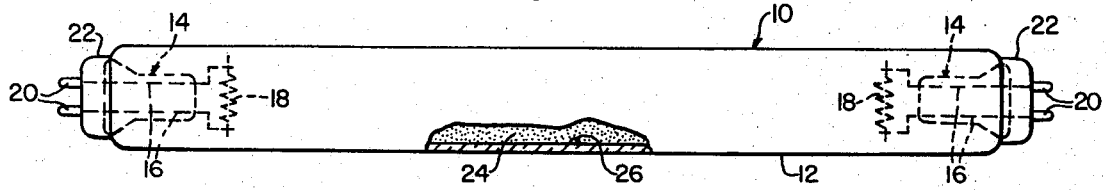
FIG. 2 is a flow chart illustrating the steps of the method used to prepare a typical coating composition for coating discharge lamp envelopes.

With reference to FIG. 1, there is shown a 40W T12 type discharge lamp 10 comprising a tubular light-transmitting vitreous envelope 12, which is fabricated of the usually sodalime-silica glass, for example. Mounts 14 are sealed to the ends of the envelope 12, as is customary. Lead-in conductors 16 support an oxide-coated filament 18 at each envelope end, and electrical connections for the lead-in conductors 16 are made by contact pins 20 which project from support base caps 22 at either end of the lamp 10. The envelope 12 has coated on its inner surface a phosphor material 24, which in accordance with this invention is deposited using a deionized solution of hydroxy alkyl cellulose, preferably hydroxy propylmethyl cellulose. As is conventional, the envelope also contains a small filling of argon or other inert ionizable starting gas at a pressure of about 4 torr, for example. Also contained within the envelope 12 is the usual small charge of mercury 26. In the operation of such a lamp, the phosphor coating is excited by the 254 nm. resonant radiation of the mercury discharge in order to produce longer wavelength radiations.

The hydroxy alkyl celluloses are particularly suitable for coating fluorescent materials since the tendency for the finely divided fluorescent materials to flocculate is minimized and the aforementioned celluloses are quite inert with respect to any tendency for chemical reaction with the phosphors. In their commercially available form, however, most of the hydroxy alkyl celluloses contain sodium salt residues in amount which is often as great or greater than 2 percent by weight of the cellulose. It is generally accepted in the art that such levels of sodium are quite harmful to the efficiency of the completed discharge device. Apparently the sodium salt impurities are present because of the use of sodium hydroxide in the production of the hydroxy alkyl celluloses. Most of the sodium salt residue is predominantly in the form of sodium acetate and could be removed by alcohol rinses, but such rinses would of course involve substantial production and other problems as outlined hereinbefore.

In accordance with the present invention, the sodium salts, as well as other ionized impurities, are readily removed from the polymer by first dissolving same in water and then passing the solution through an ion exchange system. This ion exchange system removes ionized impurities and does not react in any way with the dissolved hydroxy alkyl cellulose. Such ion exchange systems are commercially available and one specific type utilizes synthetic, water-insoluble resins such as polystyrene, which are chemically treated in order to create electrically charged active sites on the porous structure of the resin. These charged sites sorb the strongly charged ions as they pass. The ion-exchanging system also includes another ion species, either hydrogen or hydroxyl, which are released in order to balance the system. Such ion exchange beds normally are used to absorb the positive ions in one bed and the negative ions in a second bed. In this case, the primary positive ions which will be sorbed are sodium and the primary negative ions which are sorbed are acetate ions, and to a lesser degree chlorine ions. Such ion exchange systems are well known and are commercially available from a variety of manufacturers. The use of such ion exchange systems is particularly applicable to the present invention because of the chemical inertness of the hydroxy alkyl cellulose systems which, unlike many other polymer systems, will not react with the ion exchange resins.

As will be described in the following specific examples, there preferably is added to the coating solution, either before the binder resin is purified or after purification, wetting agent, defoaming agent, and plasticizer. Finely divided inorganic phosphors are then suspended in the purified solution along with a small amount of adhesion promoting materials such as colloidal aluminum oxide particles. General steps of the method are set forth in the flow chart as shown in FIG. 2. The following are specific examples for coating envelopes in accordance with the present invention.

EXAMPLE 1

In order to coat cool white halophosphate phosphor, which phosphor is preferably processed in accordance with the spray drying technique as set forth in U.S. Pat. No. 3,023,339, dated Feb. 27, 1962, a stock solution of 8.0 gms. of hydroxy propylmethyl cellulose is dissolved in one liter of water. The dissolved solution is then passed through a mixed bed polystyrene ion exchange system in order to remove the impurities from the solution. Thereafter to 100cc of the purified solution is added to 0.3 gm. of colloidal aluminum oxide, 0.04 gm. of a commercial wetting agent, 0.04 gm. of commercial defoaming agent, 1.2 gms. of plasticizing agent. Then 70 gms. of cool white halophosphate phosphor is stirred into the foregoing in order to form the paint. The resulting paint is then flowed over the fluorescent lamp envelope to such a thickness that about 7 gms. of phosphor is deposited on a 40W T12 bulb. After coating, the envelope is dried to remove the water and then lehred by heating to a temperature of approximately 550° C for about 1½ minutes in order to completely volatilize and combust the residual cellulose binder material.

In the foregoing paint, up to 2 grams of the colloidal aluminum oxide, which serves as an adhesion promoter can be added. Such material is commercially available under the trademark "Alon C" from Degussa Inc. Various wetting agents can be used and a particularly suitable wetting agent is one having the formula $RC_6H_4O(CH_2CH_2O)_nCH_2CH_2OH$, wherein $n$ is a whole integer and R is one of the group consisting of $C_8H_{17}$ and higher homologs thereof. In the foregoing paint, it can be added in amounts up to 1 gram. Such a material is sold under the trademark "Igepal CO 610", marketed by General Aniline and Film Corp. Various defoamers can be used and are available commercially. As an example, polyethylene oxide derivative type defoamers are very suitable. A defoamer can be added to the above paint in amounts up to 0.5 grams. Glycerin as a plasticizing agent can be used in amounts of up to 4 grams in the foregoing example. The plasticizing agent is added in order to permit the coating to dry at a controlled rate and in a uniform fashion and to provide a more flexible dried film to reduce flaking. In the above paint, the amount of cool white halophosphate phosphor can be varied from 10 to 100 gms. Changing the proportion of phosphor is one method of varying the thickness of the phosphor coating on the lamp envelope.

EXAMPLE 2

In order to coat calcium tungstate phosphor, 1.0 gm. of hydroxy ethyl cellulose is completely dissolved in 100cc of water. To this is added 0.3 gm. of colloidal aluminum oxide, 0.04 gm. of the wetting agent as specified under Example 1 and 0.04 gm. of the defoamer as specified under Example 1. The resulting mixture is then passed through the ion exchange system, as specified hereinbefore, in order to purify same and 70 gms. of finely divided calcium tungstate phosphor is then suspended therein. The resulting suspension is milled in order to insure that the suspension is completely uniform and the paint is then ready to be coated onto the fluorescent lamp bulb.

EXAMPLE 3

In order to coat a pigment onto a fluorescent lamp envelope, 0.44 gm. of hydroxy propylmethyl cellulose is dissolved in 55 cc of water. The resulting solution is passed through the ion exchange system as specified hereinbefore and to the purified solution is added 45 cc of deionized water, 20 gms. of a conventional cadmium sulfide/selenide pigment along with 0.04 gm. of the wetting agent as specified hereinbefore. The resulting paint is milled in order to insure a thorough suspension of the pigment and is then ready for coating in the manner as described hereinbefore. A phosphor, such as cool white halophosphate phosphor is then coated over the pigment. As an example, 0.5 gm. of hydroxy propyl cellulose is dissolved in 100 cc of water and then passed through an ion exchange system as described hereinbefore in order to purify the solution. There is then added thereto, 0.3 gm. of the colloidal aluminum oxide as described hereinbefore, 0.04 gm. the previously described wetting agent, 0.04 gm. of the previously described defoamer and 70 gms. of cool white halophosphate phosphor. The phosphor is then coated over the previously deposited pigment in the manner as described hereinbefore.

A wide range of percentages of the hydroxy alkyl celluloses can be used, depending both on the desired paint viscosity and on the molecular weight of the cellulose. Typically the paint is used at viscosities from as low as 25 centipoises to as high as 150 centipoises. For example, a hydroxy alkyl cellulose with a high molecular weight would give a viscosity of 25 centipoises with as little as 0.06 percent by weight of the weight of the water, and, if the paint is about 50 percent by weight of inorganic particles to be coated, the hydroxy alkyl cellulose would be only about 0.03 percent of the weight of said paint. Conversely, a paint with a viscosity of 150 centipoises and about 10 percent by weight of inorganic particles to be coated, would, when made with a hydroxy alkyl cellulose of low molecular weight, require as much as 5 percent hydroxy alkyl cellulose by weight of said paint.

Various hydroxy alkyl celluloses can be used and these include hydroxy propylmethyl cellulose, hydroxy propyl cellulose, hydroxy ethyl cellulose, and hydroxy butyl cellulose. These would be used essentially in the equivalent amounts, if one type of hydroxy alkyl cellulose were substituted for another of similar molecular weight. Partial substitution can also be made as the various hydroxy alkyl celluloses can be mixed in any proportions. As a general rule, in order to provide the best properties for the coating composition, the molecular weight of the hydroxy alkyl cellulose should be such that a 2 percent solution viscosity falls between the range 100,000 cps and 10 cps. This approximately corresponds to a number average molecular weight ranging between 200,000 and 10,000. The preferred molecular weight range is such that the 2 percent solution viscosity falls between 50,000 and 100, which is approximately equivalent to a number average molecular weight range of 160,000 to 25,000. It should be understood, however, that these molecular weight and viscosity ranges can be extended if desired.

Figure 4:
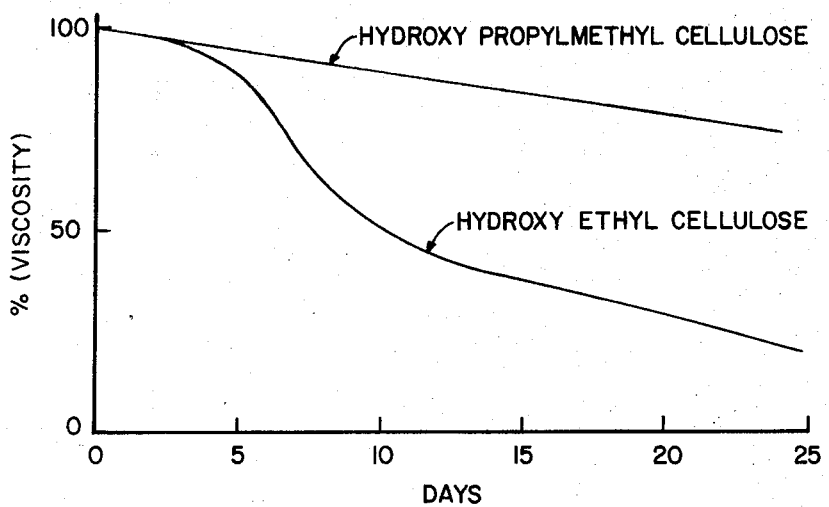
FIG. 4 is a graph of test results showing viscosity changes with time for hydroxy propylmethyl cellulose and for hydroxy ethyl cellulose.

One of the problems encountered in the use of some hydroxy alkyl celluloses is that of micro-organism attack, which is particularly manifested under factory conditions when handling the material on a continuous production basis. This problem is actually accentuated by the use of deionizing systems as apparently the micro-organisms can exist and actually thrive within the beds of ion exchange systems under production conditions. It is therefore preferable to use a hydroxy alkyl cellulose which the micro-organisms do not readily attack and hydroxy propylmethyl cellulose is preferred for this reason, in contrast to hydroxy ethyl cellulose which is subject to much more rapid attack by the micro-organisms. Results of a test of viscosity versus time are shown in FIG. 4. In this test the viscosity of hydroxy ethyl cellulose, curve B, dropped much more rapidly than the hydroxy propylmethyl cellulose, curve A.

Figure 3:
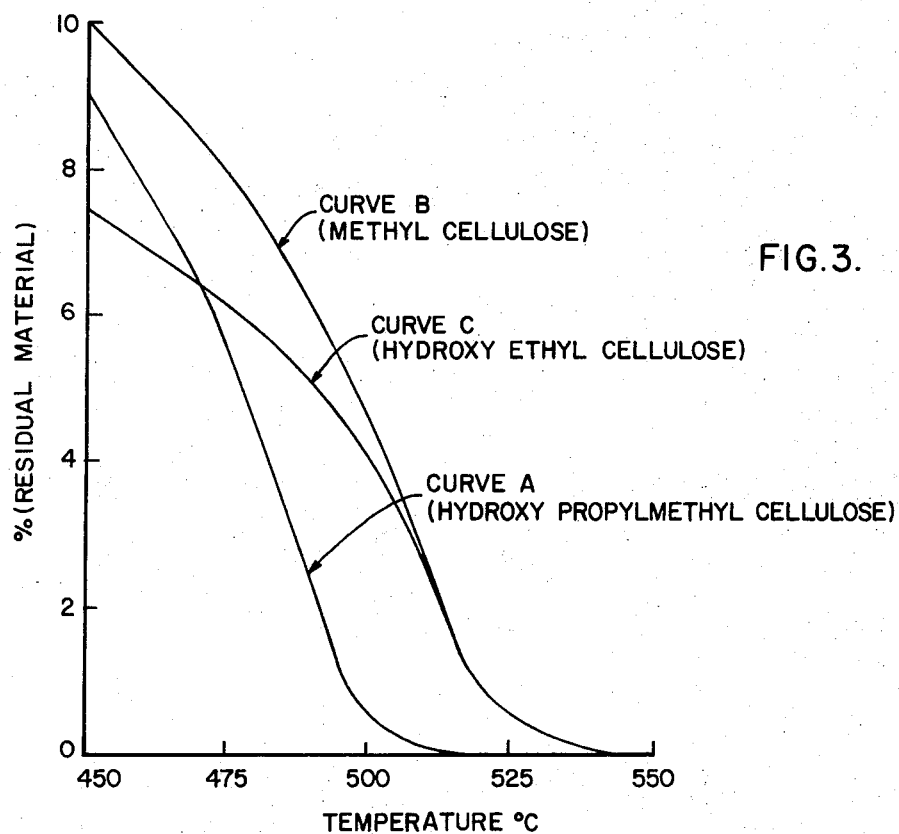
FIG. 3 is a graph setting forth weight of polymer sample versus burnout temperature for deionized samples of hydroxy propylmethyl cellulose, methyl cellulose and hydroxy ethyl cellulose.

In addition, experiments have indicated that hydroxy propylmethyl cellulose will volatilize during lehring at a lower temperature than the hydroxy ethyl cellulose. Referring to FIG. 3, there is plotted therein the weight of coated binder as plotted versus temperature. The curve "A" was taken for hydroxy propylmethyl cellulose, the curve "B" was taken for methyl cellulose and the curve "C" was taken for hydroxy ethyl cellulose. As shown in these Figures, the hydroxy propylmethyl cellulose burns out more rapidly than the other indicated materials. Hydroxy propylmethyl cellulose decomposes and thus burns out in a reasonable time at a temperature less than 525°C which not only makes it more compatible with pigments such as cadmium sulfide/selenide which start to discolor at approximately 525°C, but does have some effect in improving lamp performance since lehring at relatively high temperatures can be injurious to some degree to coated phosphors. In contrast, hydroxy ethyl cellulose and methyl cellulose, with a short lehring time as is required for commercial production, require a temperature of over 525°C to decompose. In the controlled tests used for taking the data as plotted in FIG. 3, the temperature of coatings was raised at a rate of 15°C per minute while flushing the heated air therethrough at a rate of 0.2 liters per minute. In addition, the discoloration problems, methyl cellulose has the aforementioned undesirable flow properties, caused apparently by its somewhat marginal solubility in the water vehicle, and also has a tendency to be precipitated in the presence of phosphors such as calcium tungstate.

We claim as our invention:

1. The method for preparing a suspension for coating the interior surface of a discharge lamp envelope with a substantially uniform layer of finely divided inorganic particles, said method comprising:
  a. preparing an aqueous solution of a hydroxy alkyl cellulose consisting essentially of from about 0.06 to 5 percent by weight of at least one of hydroxy propylmethyl cellulose, hydroxy propyl cellulose, hydroxy ethyl cellulose, and hydroxy butyl cellulose,
  b. purifying said aqueous solution by passing said aqueous solution through an ion exchange system to remove substantially all of the dissolved salts,
  c. adding any additional water to said purified solution as required to achieve a predetermined viscosity therefor, and
  d. adding to said purified solution a measured weight of said finely divided inorganic particles to be coated, said measured weight of inorganic particles, being from about 5 to 50 percent of the weight of said suspension.

2. The method as specified in claim 1 wherein the hydroxy alkyl cellulose used in said aqueous solution consists essentially of hydroxy propylmethyl cellulose.

3. The method as specified in claim 1, wherein prior to purifying said aqueous solution, a wetting agent, a defoaming agent, and a plasticizing agent are added thereto.

4. A coating composition having a level of dissolved salts less than 0.0001 percent for applying a substantially uniform thin layer of inorganic particles onto the interior surface of a discharge lamp envelope, said coating substantially comprising:
  a. from about 0.06 to 2 percent by weight of hydroxy propylmethyl cellulose, and
  b. from about 5 to 50 percent by weight of finely divided inorganic particles, and
  c. the remainder being water.

5. The coating composition as defined in claim 4, wherein said inorganic particles consist essentially of phosphor particles.

6. The coating composition as defined in claim 4, wherein said inorganic particles consist essentially of pigment particles.

* * * * *